(12) United States Patent
Hedayat

(10) Patent No.: US 9,801,206 B2
(45) Date of Patent: Oct. 24, 2017

(54) SPATIAL REUSE BASED ON DISTRIBUTED REPORTING

(71) Applicant: NEWRACOM, Inc., Irvine, CA (US)

(72) Inventor: Ahmad Reza Hedayat, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 124 days.

(21) Appl. No.: 14/966,507

(22) Filed: Dec. 11, 2015

(65) Prior Publication Data

US 2016/0174254 A1    Jun. 16, 2016

Related U.S. Application Data

(60) Provisional application No. 62/091,372, filed on Dec. 12, 2014.

(51) Int. Cl.
| | |
|---|---|
| *H04W 4/00* | (2009.01) |
| *H04W 74/00* | (2009.01) |
| *H04W 84/12* | (2009.01) |
| *H04W 74/08* | (2009.01) |

(52) U.S. Cl.
CPC ...... *H04W 74/006* (2013.01); *H04W 74/0808* (2013.01); *H04W 84/12* (2013.01)

(58) Field of Classification Search
CPC combination set(s) only.
See application file for complete search history.

(56) References Cited

U.S. PATENT DOCUMENTS 7,830,848 B2 *  11/2010  Mhatre ............. H04W 74/0808
                                                   370/241
9,655,145 B2 *   5/2017  Son ....................... H04B 17/318

\* cited by examiner

*Primary Examiner* — Frank Duong
(74) *Attorney, Agent, or Firm* — Nicholson De Vos Webster & Elliott, LLP

(57) ABSTRACT

The embodiments provide a method implemented by a network device in a wireless local area network (WLAN) that improves efficiency for clear channel assessment (CCA) in the WLAN. The network device processes information announced by other network devices in the WLAN and uses this information to determine a CCA regime to be used in a basic service set (BSS) associated with the network device. The method encodes an outgoing frame with an indication of the CCA regime to be used in the BSS and transmits the outgoing frame through a wireless medium.

20 Claims, 10 Drawing Sheets

| Field | Description |
|---|---|
| L-STF | Non-HT Short Training field |
| L-LTF | Non-HT Long Training field |
| L-SIG | Non-HT SIGNAL field |
| VHT-SIG-A | VHT Signal A field |
| VHT-STF | VHT Short Training field |
| VHT-LTF | VHT Long Training field |
| VHT-SIG-B | VHT Signal B field |
| Data | The Data field carries the PSDU(s) |

SPATIAL REUSE BASED ON DISTRIBUTED REPORTING

CROSS-REFERENCE TO RELATED APPLICATIONS

This application claims the benefit of U.S. Provisional Application No. 62/091,372, filed Dec. 12, 2014, which is hereby incorporated by reference.

FIELD OF INVENTION

The embodiments of the invention are related to the field of wireless local area network (WLAN) operation. More specifically, the embodiments of the invention relate to a context-aware mechanism for determining a clear channel assessment (CCA) regime to use. Other embodiments are also disclosed.

BACKGROUND

Institute of Electrical and Electronics Engineers (IEEE) 802.11 is a set of physical and media access control (MAC) specifications for implementing wireless local area network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

IEEE 802.11 based WLAN systems rely on Clear-Channel-Assessment (CCA), in the physical layer (PHY) that determines the current state of use of the wireless medium (WM), such that a station will access a given wireless channel only when the WM becomes idle (i.e. there is no transmission on the wireless medium and other qualifying conditions are met). Some CCA rule mechanisms, for example some of the rule mechanisms defined in IEEE 802.11, indicate that the primary channel is Busy, if one of the conditions listed in Table I is met, otherwise the primary channel is determined to be Idle. If the primary channel is idle, then the PHY layer will check the secondary channels.

TABLE I

| Operating Channel Width | Conditions |
|---|---|
| 20 MHz, 40 MHz, 80 MHz, 160 MHz or 80 + 80 MHz | The start of a 20 MHz NON_HT PPDU in the primary 20 MHz channel as defined in 18.3.10.6 (CCA requirements) |
| 40 MHz, 80 MHz, 160 MHz or 80 + 80 MHz | The start of a 40 MHz non-HT duplicate or VHT PPDU in the primary 40 MHz channel at or above −79 dBm, The start of an HT PPDU under the conditions defined in 20.3.21.5 (CCA sensitivity) |
| 80 MHz, 160 MHz or 80 + 80 MHz | The start of an 80 MHz non-HT duplicate or VHT PPDU in the primary 80 MHz channel at or above −76 dBm |

TABLE I-continued

| Operating Channel Width | Conditions |
|---|---|
| 60 MHz or 80 + 80 MHz | The start of a 160 MHz or 80 + 80 MHz non-HT duplicate or VHT PPDU at or above −73 dBm |

SUMMARY

The embodiments provide a method implemented by a network device in a wireless local area network (WLAN) that improves efficiency for clear channel assessment (CCA) in the WLAN. The network device processes information announced by other network devices in the WLAN and uses this information to determine a CCA regime to be used in a basic service set (BSS) associated with the network device. The method encodes an outgoing frame with an indication of the CCA regime to be used in the BSS and transmits the outgoing frame through a wireless medium.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
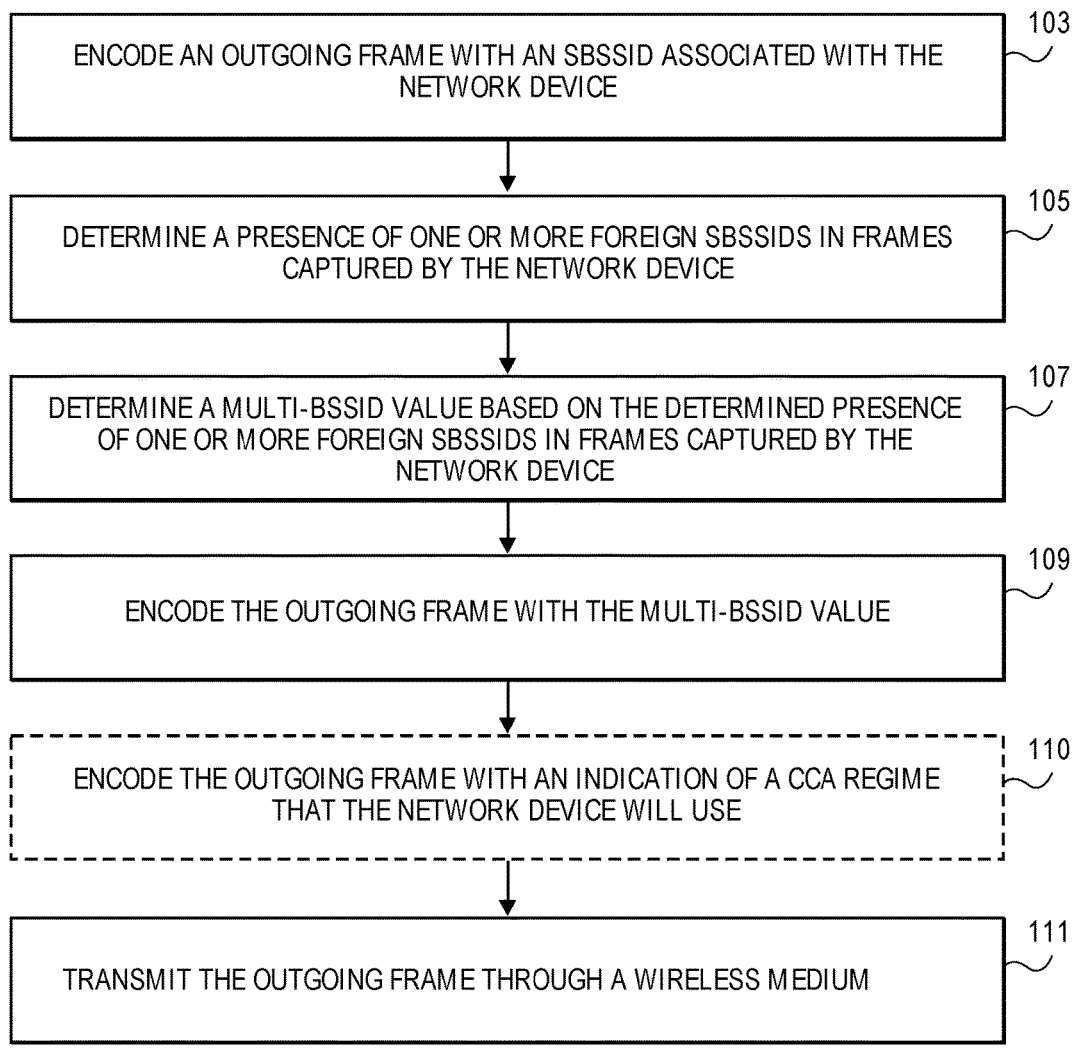
FIG. 1 is a flow diagram illustrating a process for announcing SBSSID information and Multi-BSSID information in a wireless communications network, according to some embodiments.

The embodiments provide a method for a network device (e.g., an access point (AP) or a non-AP station (STA)) in a wireless communications system (e.g., a wireless local area network (WLAN) implementing Institute of Electrical and Electronics Engineers (IEEE) 802.11) to determine when it is safe and fair to use a less sensitive clear channel assessment (CCA) threshold value (i.e., larger CCA threshold value compared to legacy/standard CCA threshold value). With the embodiments, the network device processes information announced by other network devices in the WLAN and uses this information to determine whether it can use a less sensitive CCA threshold value.

Current IEEE standards define a fixed CCA threshold value (e.g., −82 dBm for 20 MHz). However, depending on the location of the STAs/APs and the overall topology and transmission attributes of the neighboring basic service set (BSS)/overlapping BSS (OBSS), higher throughput in the WLAN may be achieved by adopting a less sensitive CCA threshold value (i.e., higher CCA threshold value). For example, in a BSS where the STAs are close to the AP, under current IEEE standards, the STAs will perform backoff if they receive a frame from any node within their −82 dBm coverage. However, given the location of the nodes in the BSS, the nodes may adopt a less sensitive CCA threshold value without significantly affecting an ongoing frame transmission. A consequence of adopting a less sensitive CCA threshold value is that additional hidden nodes appear. Thus, a STA/AP should consider these consequences when deciding whether to adopt a less sensitive CCA threshold value. The embodiments provide an improvement over fixed CCA threshold value embodiments by providing a context-aware mechanism for a node to decide when it is safe and fair to use a less sensitive CCA threshold value. This decision may be made based on information announced by other nodes. This flexibility in adopting the CCA threshold value (as opposed to utilizing a fixed CCA threshold value) increases the throughput of the WLAN.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

An electronic device stores and transmits (internally and/or with other electronic devices over a network) code (which is composed of software instructions and which is sometimes referred to as computer program code or a computer program) and/or data using machine-readable media (also called computer-readable media), such as non-transitory machine-readable media (e.g., machine-readable storage media such as magnetic disks, optical disks, read only memory, flash memory devices, phase change memory) and transitory machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set of one or more physical network interface(s) to establish network connections (to transmit code and/or data using propagating signals). Put another way, a typical electronic device includes memory comprising non-volatile memory (containing code regardless of whether the electronic device is on or off) and volatile memory (e.g., dynamic random access memory (DRAM), static random access memory (SRAM)), and while the electronic device is turned on that part of the code that is currently being executed is copied from the slower non-volatile memory into the volatile memory (often organized in a hierarchy) for execution by the processors of the electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Network devices or network elements can include stations and access points in wireless communications systems such as wireless local area network (WLAN). STAs are devices connected to and communicating in a WLAN including client or user devices that connect to the WLAN via APs. APs are network devices that may be specialized wireless access points that can communicate with other network devices in the WLAN via the wireless medium or via wired connections.

Current IEEE standards define a fixed CCA threshold value. However, with the increased demand on WLANs there is a need for more aggressive channel access, which requires increasing the CCA threshold value, to increase system throughput. However, increasing the CCA threshold value may result in more frequent packet collision and thus degrade performance.

WLAN communication systems are being deployed in diverse environments. These environments are characterized by the existence of many access points (AP) and STAs in geographically limited areas. Increased interference from neighboring network devices gives rise to performance degradation. Additionally, WLAN devices are increasingly required to support a variety of applications such as video, cloud access, and offloading. In particular video traffic is expected to be the dominant type of traffic in many high efficiency WLAN deployments. With the real-time requirements of some of these applications, WLAN users demand improved performance in delivering their applications, including improved throughput requiring improvements in the availability of the wireless medium.

In this regard, when a STA is transmitting a packet over the wireless medium, nearby STAs are not allowed to transmit to prevent collisions from happening. The area that nearby STAs are prohibited is determined by the CCA sensitivity or CCA threshold value. In a dense WLAN environment, which is a target of WLAN development, a CCA threshold value (−82 dBm for 20 MHz) might be too conservative in some scenarios such that transmission efficiency is diminished or sub-optimal. To enhance the WLAN system throughput and network efficiency, increasing the CCA threshold value is a possible solution. However, increasing the CCA threshold value (i.e., lowering CCA sensitivity) may cause other problems that may in some instances degrade network performance. The CCA threshold value is used herein as a value of CCA sensitivity representing a current signal quality level above which a signal must reach to render an associated wireless channel busy.

If the CCA threshold value is increased, transmission throughput could be increased, because each STA can be more aggressive in assessing the wireless medium, and thus the STA may transmit a frame more frequently. However, this more aggressive transmission scheme may occur even though there is a frame already occupying the wireless medium. This can result in an increased probability of packet collision, and can result in severe performance degradation under some circumstances or configurations such as for cell/BSS edge STAs.

As mentioned above, CCA threshold value is fixed in current IEEE standards even though throughput in a wireless communications network can be improved by adjusting CCA threshold levels for each BSS, or even for each STA, to an optimum value. The optimum value for the CCA threshold value depends on various factors such as the location of the STAs relative to the AP, the overall topology of the WLAN, and the transmission attributes of neighboring BSSs. Without having some information regarding its context and surrounding, it is difficult for a node (e.g., AP or STA) to infer when it is safe and fair to use a less sensitive CCA threshold value. Embodiments provide an improvement over fixed CCA threshold value embodiments by providing a context-aware mechanism by which nodes announce some information regarding its context and surroundings and other nodes can use this information to determine whether it can use a less sensitive CCA threshold value for assessing the wireless medium.

Embodiments are primarily described in the context of wireless communications systems and network devices implementing IEEE 802.11. However, it should be understood that other similar wireless communication technologies can apply the principles and structures described herein. Similarly, the use of a CCA threshold value is given as the measure for wireless medium availability assessment by way of example. However, any adaptive threshold associated with a measure of signal quality can be utilized consistent with the principles and structures described herein.

In one embodiment, STAs/APs may announce information that will help other STAs/APs decide whether it is safe and fair to use a less sensitive CCA threshold value. In one embodiment, this information includes an indication of the BSS to which the STA/AP belongs and/or an indication of whether the STA/AP captures frames mostly from its own BSS or from other BSSs. An AP may capture such information from its surroundings and use this information to determine a CCA threshold value that should be used in its BSS. The AP may then announce an indication of the determined CCA threshold level to the STAs within its BSS. The STAs then use the CCA threshold level announced by the AP when performing CCA. The embodiment described is a centralized approach where the AP decides and announces the CCA threshold level that all STAs within its BSS should use. A distributed approach is also possible where each STA captures information from its surroundings and individually determines a CCA threshold level to use.

According to some embodiments, a STA/AP may announce an indication of the BSS to which the STA/AP belongs. In one embodiment, the STA/AP may specify this information in an outgoing frame. For example, the STA/AP may include an identifier that identifies the BSS to which the STA/AP belongs in each of the outgoing frames that it transmits. Preferably, this identifier is shorter than the basic service set identifier (BSSID) of the BSS and hence it is referred to herein as a short BSS identification (SBSSID). The field in the frame that specifies the SBSSID is referred to herein as the SBSSID field. In some embodiments this shortened BSS identifier may be termed a Color field. A Color field is a short representation of a BSSID, and in this regard has the same functionality as SBSSID. In the following, SBSSID field and Color field are used interchangeably. While the BSSID is typically represented as a 48 bit value, SBSSID can be represented as a 3 bit, 4 bit, 5 bit, or 6 bit value. It should be understood, however, that the SBSSID value can be represented using any number bits, depending on the implementation (e.g., any number of bits less than 48 bits). Representing the SBSSID with more bits will reduce the probability that adjacent APs or OBSSs pick the same SBSSID. A physical AP may have multiple BSSIDs. However, the difference between these BSSIDs is usually in the least significant bits. As such, in one embodiment, the SBSSID may be formed based on BSSIDs but excluding the least significant bits so that multiple BSSIDs that belong to the same physical AP result in a unique SBSSID. Therefore, in one embodiment, the SBSSID (or Color) fields, which are associated with an AP with several BSSIDs, are all the same. That is, despite several different BSSID values for the several BSSs that are created by a single AP, their SBSSID (or Color) fields have the same value. For example, the SBSSID (or Color) fields that are associated with an AP with several BSSIDs have different values in their least significant bits, e.g. for an AP with four BSSID, the SBSSID (or Color) fields have values 00, 01, 10, and 11 in their two LSBs, but the rest of the bits are the same for all of the SBSSID (or Color) fields. In another embodiment, the SBSSID (or Color) fields that are associated with an AP with several BSSID have different values.

According to some embodiments, a STA may announce an indication of whether it captures frames that announce an SBSSID that is different from the SBSSID that the STA is associated with. This indication is referred to herein as Multi-BSSID information. In one embodiment, the STA may specify this information in an outgoing frame. For example, the STA that has captured/detected frames with foreign SBSSID in some specified time period (e.g., the past several milliseconds, during the current/previous Beacon interval, or a specific amount of time right before the start of a TXOP) may include an indication of this detection in each of the outgoing frames that it transmits. The field in the frame that specifies this Multi-BSSID information is referred to as the Multi-BSSID field. As used herein, a foreign SBSSID with respect to a STA/AP is an SBSSID that is different from the SBSSID associated with the BSS to which the STA/AP belongs. For example, for a STA/AP that belongs to a BSS, an SBSSID of an OBSS of the BSS would be a foreign SBSSID with respect to the STA/AP. In one embodiment, the Multi-BSSID information can be represented using a single bit. For example, a STA may announce a Multi-BSSID value of 1 to indicate that the STA has recently captured frames that announce a foreign SBSSID, and otherwise announce a Multi-BSSID value of 0. In one embodiment, the STA may ignore an occasional appearance of a foreign SBSSID and only report seeing multiple foreign SBSSIDs if the STA captures several frames with foreign SBSSIDs over a period of time (e.g., the past several milliseconds, during the current/previous Beacon interval, or a specific amount of time right before the start of a TXOP). In one embodiment, Multi-BSSID information can be represented using more than one bit. This allows the STA to report the appearance of foreign SBSSIDs with more fidelity (e.g., more accurately convey the amount of foreign SBSSIDs observed). In one embodiment, the Multi-BSSID field can be used to report the actual foreign SBSSID(s) that the STA has observed.

As will be described in additional detail herein below, an AP may examine the SBSSID and Multi-BSSID information included in frames that it captures to determine a CCA threshold value that the STAs within its BSS should use. The AP may then announce an indication of this CCA threshold value to the STAs within its BSS. For example, the AP may announce an indication that the STAs in its BSS should use a legacy CCA threshold value or announce an indication that the STAs in its BSS should use a less sensitive CCA threshold value. This information is referred to herein as CCA-Regime information. In one embodiment, the AP may specify the CCA-Regime information in an outgoing frame. The field in the frame that specifies the CCA-Regime information is referred to herein as the CCA-Regime field. In the case there are two CCA threshold values that are a priori known to the STAs in the AP's BSS (e.g., legacy CCA threshold value and a less sensitive CCA threshold value), it may be sufficient to represent the CCA-Regime information using a single bit (e.g., a value of 0 indicates that the STAs should use the legacy CCA threshold value and a value of 1 indicates that the STAs should use the less sensitive CCA threshold value that is already known to all the STAs in the BSS). It should be understood, however, that the CCA-Regime information can be represented using any number of bits, depending on the implementation. Using more bits to represent the CCA-Regime information will allow the AP to specify more varying levels of CCA threshold values. In another embodiment, the CCA-Regime field in an outgoing frame indicates what level of CCA threshold the transmitting STA is using and operating under. In another embodiment, the CCA-Regime field in an outgoing frame indicates what level of CCA threshold the transmitting STA is expecting that a non-recipient STA to use when the non-recipient STA receives the frame that carries the CCA-Regime field.

In one embodiment, the SBSSID field, the Multi-BSSID field, and the CCA-Regime field are included in the physical layer header of an IEEE 802.11 frame before the payload. In IEEE 802.11, the physical layer header typically has multiple parts including Short Training Field (STF), Long Training Field (LTF), and Signal Field (SIG) parts. For the next generation IEEE 802.11 or Wi-Fi standards/protocols, the header includes Legacy Short Training Field (L-STF), Legacy Long Training Field (L-LTF), Legacy Signal Field (L-SIG), 11ax-STF (i.e., High Efficiency Short Training Field (HE-STF)), 11ax-LTF (i.e., High Efficiency Long Training Field (HE-LTF)), 11ax-SIG-A (i.e., High Efficiency Signal Field A (HE-SIG-A)), 11ax-SIG-B (i.e., High Efficiency Signal Field B (HE-SIG-B)), and possibly 11ax-SIG-C (i.e., High Efficiency Signal Field C (HE-SIG-C)) parts. In one embodiment, some or all of the fields (i.e., SBSSID field, Multi-BSSID field, and CCA-Regime field) are included in the 11ax-SIG-A portion of the header. Depending on the size of the fields, some or all of the fields may be included in the 11ax-SIG-B portion. In another embodiment, one or more of the SBSSID field, the Multi-BSSID field, and the CCA-Regime field are included in the MAC header of an outgoing frame. In some embodiments, these fields in the MAC header may be specifically located in the High Throughput (HT) Control field High Efficiency (HE) variant (which in short is noted as HE Control or HEC field). When an HEC field carries the above pieces of data, it may identify these fields by an indication in the beginning of the HEC field. Such content in the HEC field and its associated identifier might be denoted as Spatial Reuse (SR) or SR-HEC. In yet another embodiment, one or more of the SBSSID field, the Multi-BSSID field, and the CCA-Regime field are included in an Information Element (IE) that can be aggregated in a control, data, or management frame.

The CCA-Regime field is sometimes set by APs and not by STAs. As such, STAs can use the bits of the CCA-Regime field to specify other types of information (e.g., to specify Multi-BSSID information). The Multi-BSSID field may only be set by STAs and not by APs. As such, the AP can use the bits of the Multi-BSSID field to specify other types of information. In some embodiments, a STA sets the CCA-Regime field in an outgoing frame to indicate what level of CCA the STA is using (or has used in a given past interval) or to indicate what level of CCA the STA is expecting that a non-recipient STA should use when the non-recipient STA receives the outgoing frame. The following describes some details related to the embodiments where the CCA-Regime field in an outgoing frame indicates the level of CCA that the transmitter STA has used (or is using) to evaluate the availability of the wireless medium: (a) when a STA receives a first frame that is not intended for the STA, then the STA shall use the same or more sensitive CCA regime or level as indicated in the first frame to evaluate whether the wireless medium is available, and if the STA concludes the medium is available then the STA shall set the CCA-Regime in its outgoing frame to the same or a less sensitive CCA-Regime value as in the first frame, (b) when a STA receives a first frame that is intended for the STA and the STA is expected to send a response frame, then the STA indicates the same CCA regime or level, as in the first frame, in the response frame(s) that is going to send, or the STA indicates a reserved value in the CCA-Regime of the response frame(s) that is going to send. In some embodiments, the value of the CCA-Regime in an outgoing frame may be set based on the value of the CCA-Regime in the first frame that a STA receives (but is not intended for the STA), the value of SBSSID in the first frame, and the value of SBSSIDs that the STA is associated with: (a) if the value of SBSSID in the first frame is different than the value of all the SBSSIDs that the STA is associated with, then the STA may use a less sensitive CCA regime or level (e.g. CCA2) to evaluate the availability of the wireless medium, and if the STA concludes that the medium is available, the STA shall indicate the same or a less sensitive CCA regime or level (CCA2) in the CCA-Regime field in its outgoing frame, (b) if the value of SBSSID in the first frame is the same to the value of one of the SBSSIDs that the STA is associated with, then the STA may use the same or more sensitive CCA regime or level (e.g. CCA1) to evaluate the availability of the wireless medium, and if it concludes that the medium is available, the STA shall indicate that CCA regime or level (CCA1) in the CCA-Regime field in its outgoing frame only if the outgoing frame(s) is not intended for the sender or recipient of the first frame. A less sensitive CCA level refers to a CCA level that is higher than a reference CCA level, e.g. with respect to CCA level reference −79 dBm, CCA level of −72 dBm is a less sensitive level and CCA level of −82 dBm is a more sensitive level.

The SBSSID field, Multi-BSSID field, and CCA-Regime field can be included in single-user (SU) frames as well as multi-user (MU) frames. In one embodiment, an AP may specify SBSSID information, Multi-BSSID information, and CCA-Regime information in both its downlink SU frames and downlink MU frames. In one embodiment, a STA may specify the SBSSID information, the CCA-Regime information, and the Multi-BSSID information in the SU frames it sends, but not in the MU frames it sends. As such, for uplink orthogonal frequency-division multiple access (OFDMA) frames and uplink MU Multiple-Input and Multiple-Output (MIMO) frames where multiple STAs participate to form a single UL frame, the SBSSID (or Color) field, Multi-BSSID field, and CCA-Regime field may not be present, set to a pre-determined value, designated as a reserved field, or set to the same values of corresponding fields in the frame that elicits the UL MU frame. Particularly, the SBSSID (or Color) field and CCA-Regime field in an UL MU frame (set by each of the STAs that participates in the UL MU frame) are set to the same values in the same fields in the Trigger frame that has elicited the UL MU frame.

In one embodiment, the SBSSID field, Multi-BSSID field, and CCA-Regime field may be present in all data frames. In one embodiment, these fields may not be present in control frames or management frames that are carried with legacy frame formats, and may be present in control frames or management frames that are carried with HE frame formats. In some embodiments, even if a frame is carried in a legacy format, the SBSSID field, Multi-BSSID field, and CCA-Regime field may be present in an IE such that HE STAs are capable of reading the IE. In some embodiments, where a frame is carried in an HE format, the SBSSID field, Multi-BSSID field, and CCA-Regime field may be present in an IE or in an HT Control HE variant (or HE Control) field. It should be noted that, depending on implementation, not all of the fields are required to be present in a frame. In some embodiments, the frames may only include a subset of the fields.

FIG. 1 is a flow diagram illustrating a process for announcing SBSSID information and Multi-BSSID information in a wireless communications network, according to some embodiments. In one embodiment, the operations of the flow diagram may be performed by a network device (e.g., STA or AP) in the wireless communications network. The process announces SBSSID information and Multi-BSSID information to other STAs/APs in the wireless communications network.

In one embodiment, the process is initiated when the network device has an outgoing frame to transmit. The network device encodes the outgoing frame with an SBSSID associated with the network device (block 103). The SBSSID identifies a BSS associated with the network device. In one embodiment, the SBSSID is encoded using less bits than a BSSID of the BSS associated with the network device.

The network device determines a presence of one or more foreign SBSSIDs in frames captured by the network device (block 105). In one embodiment, the network device checks the SBSSID field of the frames it captures to determine the presence of foreign SBSSIDs (i.e., an SBSSID that is different from that associated with the network device). In one embodiment, the network device keeps track of the foreign SBSSIDs it has detected in the received frames and possibly the number of times it has detected each foreign SBSSID in a given time interval. In one embodiment, the network device may determine that a foreign SBSSID is present if it has observed a foreign SBSSID within a recent time interval. In one embodiment, the network device may ignore an occasional appearance of a foreign SBSSID and only determine that a foreign SBSSID is present if it captured several frames announcing a foreign SBSSID over a recent time interval.

The network device determines a Multi-BSSID value based on the presence of one or more foreign SBSSIDs in frames captured by the network device (block 107). In one embodiment, the Multi-BSSID value is a binary value that indicates whether the network device has determined a sufficient presence of foreign SBSSIDs. For example, if the network device has determined a sufficient presence of foreign SBSSIDs (e.g., the number of captured frames announcing foreign SBSSIDs over a recent time period exceeds a threshold level), then the network device may set the Multi-BSSID value to 1. Otherwise, if the network device has not determined a sufficient presence of foreign SBSSIDs, then the network device may set the Multi-BSSID value to 0. In some embodiments, the Multi-BSSID value is represented using more than one bit.

The network device then encodes the outgoing frame with the Multi-BSSID value (in addition to the SBSSID, as shown in block 103) (block 109) and transmits the outgoing frame through a wireless medium (block 111). In this way, the network device announces SBSSID information and Multi-BSSID information to other STAs/APs in the wireless communications network. The other STAs/APs may use this information announced by the network device (and similar information announced by other nodes) to determine an appropriate CCA regime to use. In one embodiment, the network device encodes the outgoing frame with an indication of the CCA regime (i.e., CCA threshold value) it will use (block 110) before transmitting the outgoing frame through the wireless medium (block 111), where the CCA regime indicates the CCA threshold level for a given bandwidth (e.g., 20 MHz) that the network device uses to perform its PHY and MAC processing.

In one embodiment, an AP determines the CCA regime to be used within its BSS (and for its own operation) and announces the CCA regime to the STAs in its BSS. The STAs then use the CCA regime announced by the AP. This approach is referred to herein as a centralized approach. In another embodiment, each STA individually determines the CCA regime it will use. This approach is referred to herein as a distributed approach.

Figure 2:
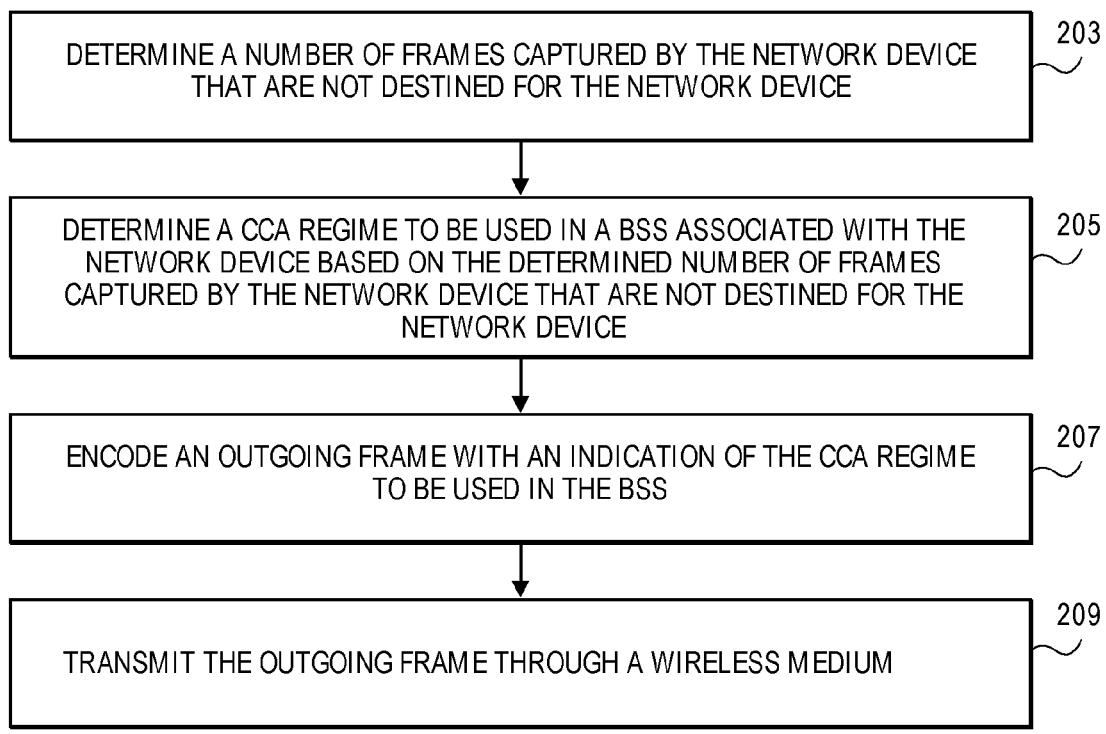
FIG. 2 is a flow diagram illustrating a process for determining and announcing a CCA regime to use in a wireless communications network, according to some embodiments.

FIG. 2 is a flow diagram illustrating a process for determining and announcing a CCA regime to use in a wireless communications network, according to some embodiments. In one embodiment, the operations of the flow diagram may be performed by a network device acting as an AP in the wireless communications network. The process is an example of a centralized approach where the AP determines and announces the CCA regime to be used in its BSS and the STAs in its BSS are to use the CCA regime announced by the AP. In this process, the AP may not rely on SBSSID information or Multi-BSSID information to determine the CCA regime to be used in its BSS. Rather, the AP determines the CCA regime to be used in its BSS based on the number of frames it captures that are destined to a different node.

The network device (i.e., AP) determines a number of frames captured by the network device that are not destined for the network device (e.g., frames from an OBSS) (block 203). In one embodiment, the network device keeps track of the frames it has captured that are not destined for the network device. This may involve recording destination information extracted from the captured frames. In one embodiment, the network device applies a moving filter over the recorded destination information. The moving filter applies some processing over the recorded destination information. For example, the moving filter may enumerate the number of frames captured during a recent time interval that are not destined for the network device or enumerate the number of such frames captured during a recent time interval with significant mass (e.g., frames having a destination that is observed more than a minimum number of times or more than a minimum percentage of times during a recent time interval). In another example, the moving filter may enumerate the number of frames captured during a recent time interval that do not carry the same SBSSID as the SBSSID that the STA is associated with. In another example, the moving filter may enumerate the number of frames captured during a recent time interval that carry a SBSSID, among the set of SBSSIDs that have been captured and that are not equal to the SBSSID that the STA is associated with.

The network device determines a CCA regime to be used in its BSS based on the determined number of frames captured by the network device that are not destined for the network device (block 205). The CCA regime (i.e., CCA threshold value) indicates a CCA threshold level used by all devices in the AP's BSS to assess availability of a wireless medium upon which all the devices in that BSS are operating. In one embodiment, the network device determines the CCA regime to be used in its BSS based on a filtered version of the destination information (e.g., filtered using the moving filter). If the network device observes several captured frames that are destined to other nodes, this implies the possibility that there is an OBSS or IBSS operating within its coverage. As such, in one embodiment, if the network device determines that the number of frames captured by the network that are not destined for the network device exceeds a pre-determined threshold value, the network device may determine that a more aggressive CCA regime (e.g., higher CCA threshold value) should be used in its BSS. It should be noted that the network device may determine the CCA regime to be used in its BSS based on other factors as well.

The network device then encodes an outgoing frame with an indication of the CCA regime to be used in its BSS (block 207) and transmits the outgoing frame through a wireless medium (block 209) upon determining that the wireless medium is idle (e.g., using the CCA threshold value). In this way, the network device determines the CCA regime to be used within its BSS and announces this CCA regime to the STAs within its BSS.

Figure 3:
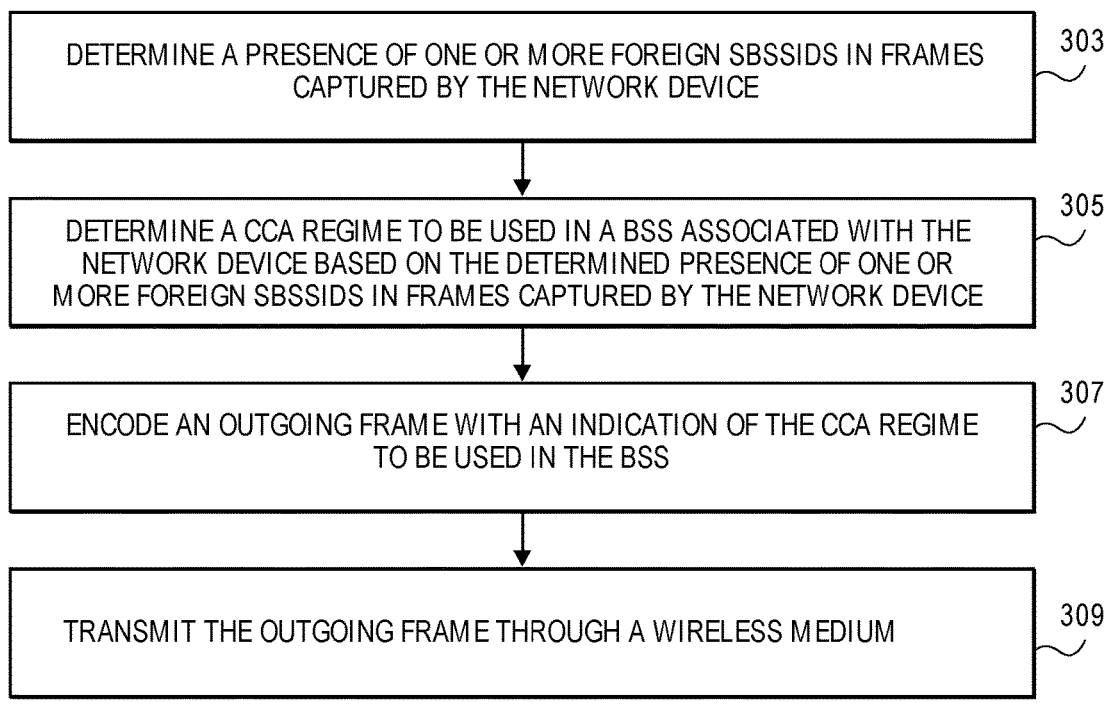
FIG. 3 is a flow diagram illustrating another process for determining and announcing a CCA regime to use in a wireless communications network, according to some embodiments.

FIG. 3 is a flow diagram illustrating another process for determining and announcing a CCA regime to use in a wireless communications network, according to some embodiments. In one embodiment, the operations of the flow diagram may be performed by a network device acting as an AP in the wireless communications network. The process is another example of a centralized approach where the AP determines and announces the CCA regime to be used in its BSS and the STAs in its BSS are to use the CCA regime announced by the AP. In this process, the AP relies on SBSSID information that it observes in captured frames to determine the CCA regime to be used in its BSS.

The network device (i.e., AP) determines a presence of one or more foreign SBSSIDs in frames captured by the network device (block 303). In one embodiment, the network device keeps track of the foreign SBSSIDs it has seen in captured frames. This may involve recording SBSSID information extracted from the captured frames. In one embodiment, the network device applies a moving filter over the recorded SBSSID information. The moving filter applies some processing over the recorded SBSSID information. For example, the moving filter may enumerate the number of foreign SBSSIDs observed during a recent time interval or enumerate the number of foreign SBSSIDs with significant mass over a recent time interval (e.g., foreign SBSSIDs that are observed more than a minimum number of times or more than a minimum percentage of times during a recent time interval). The network device may use the filtered version of the SBSSID information to determine the presence of foreign SBSSIDs.

The network device determines a CCA regime to be used in its BSS based on the determined presence of one or more foreign SBSSIDs in frames captured by the network device (block 305). The CCA regime (i.e., CCA threshold value) indicates a CCA threshold level used by all devices in the AP's BSS to assess availability of a wireless medium upon which all the devices in that BSS are operating. If the network device captures several frames announcing foreign SBSSIDs, this implies the possibility that there is an OBSS or MSS operating within its coverage. As such, in one embodiment, if the network device determines a sufficient presence of one or more foreign SBSSIDs in frames captured by the network device (e.g., the number of captured frames announcing foreign SBSSIDs over a recent time interval exceeds a threshold level), the network device determines that a more aggressive CCA regime (e.g., higher CCA threshold value) should be used in its BSS. It should be noted that the network device may determine the CCA regime to be used in its BSS based on other factors as well.

The network device then encodes an outgoing frame with an indication of the CCA regime to be used in its BSS (block 307) and transmits the outgoing frame through a wireless medium (block 309) upon determining that the wireless medium is idle (e.g., using the CCA threshold value). In this way, the network device determines the CCA regime to be used within its BSS and announces this CCA regime to the STAs within its BSS.

Figure 4:
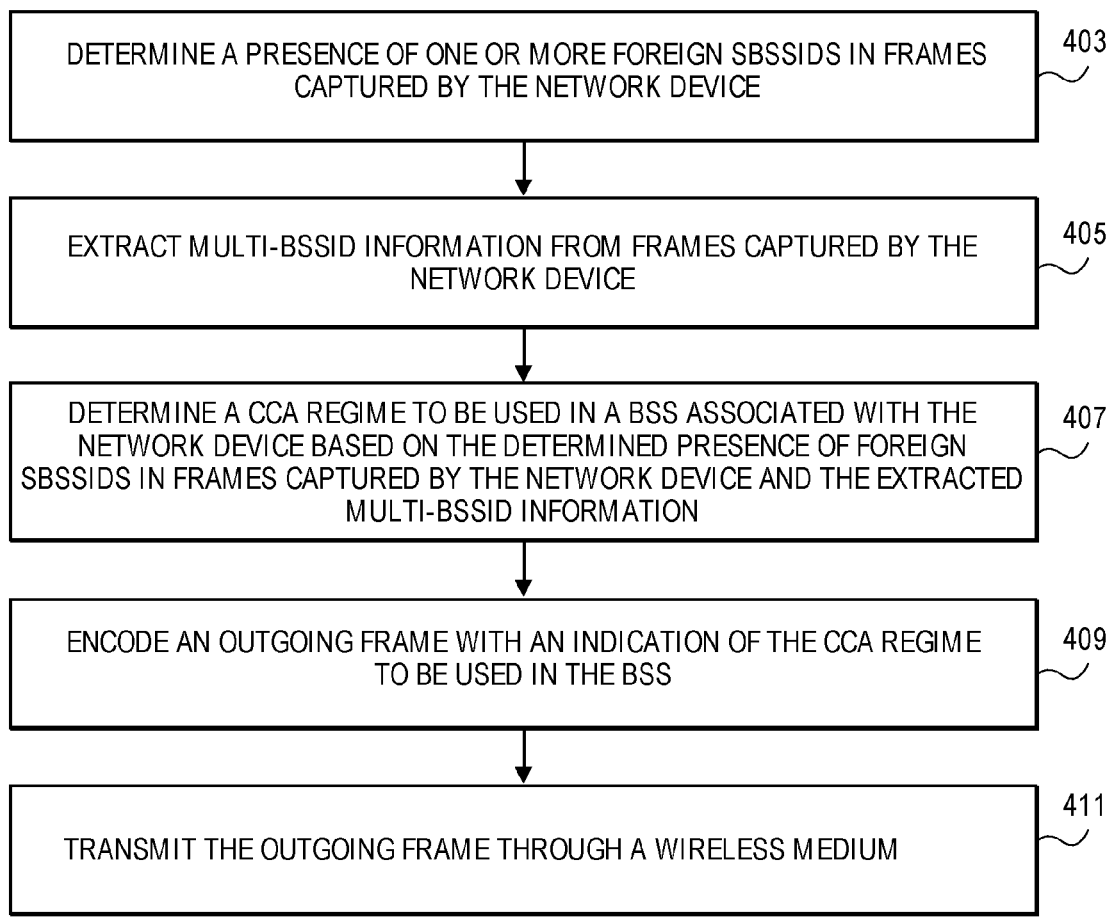
FIG. 4 is a flow diagram illustrating yet another process for determining and announcing a CCA regime to use in a wireless communications network, according to some embodiments.

FIG. 4 is a flow diagram illustrating yet another process for determining and announcing a CCA regime to use in a wireless communications network, according to some embodiments. In one embodiment, the operations of the flow diagram may be performed by a network device acting as an AP in the wireless communications network. The process is another example of a centralized approach where the AP determines and announces the CCA regime to be used in its BSS and the STAs in its BSS are to use the CCA regime announced by the AP. In this process, the AP relies on SBSSID information and Multi-BSSID information that it observes in captured frames to determine the CCA regime to be used in its BSS.

The network device (i.e., AP) determines a presence of one or more foreign SBSSIDs in frames captured by the network device (block 403). In one embodiment, the network device records SBSSID information extracted from captured frames and applies a moving filter to the recorded SBSSID information, as described with reference to block 303. The network device may use the filtered version of the SBSSID information to determine the presence of foreign SBSSIDs.

The network device extracts Multi-BSSID information from frames captured by the network device (block 405). The Multi-BSSID information in a captured frame is an indication of whether the node (e.g., network device) that originated that frame detected a presence of one or more foreign SBSSIDs. In one embodiment, the network device keeps track of the Multi-BSSID information it has seen in captured frames. This may involve recording Multi-BSSID information extracted from the captured frames.

The network device determines a CCA regime to be used in its BSS based on the determined presence of one or more foreign SBSSIDs in frames captured by the network device and the extracted Multi-BSSID information (block 407). The CCA regime (i.e., CCA threshold value) indicates a CCA threshold level used by all devices in the AP's BSS to assess availability of a wireless medium upon which all the devices in that BSS are operating. If the network device captures several frames announcing foreign SBSSIDs and/or affirmative Multi-BSSID values (i.e., values indicating that a node has captured frames that announce an SBSSID that is different from the SBSSID the node is associated with), this implies the possibility that there is an OBSS or IBSS operating within its coverage and/or within the coverage of one of its clients (e.g., a STA associated with the network device). As such, in one embodiment, if the network device determines a sufficient presence of one or more foreign SBSSIDs and/or affirmative Multi-BSSID values in frames captured by the network device (e.g., the number of captured frames announcing foreign SBSSIDs and/or affirmative Multi-BSSID values over a recent time interval exceeds a threshold level), the network device determines that a more aggressive CCA regime (e.g., higher CCA threshold value) should be used in its BSS. It should be noted that the network device may determine the CCA regime to be used in its BSS based on other factors as well.

The network device then encodes an outgoing frame with an indication of the CCA regime to be used in its BSS (block 409) and transmits the outgoing frame through a wireless medium (block 411) upon determining that the wireless medium is idle (e.g., using the CCA threshold value). In this way, the network device determines the CCA regime to be used within its BSS and announces this CCA regime to the STAs within its BSS.

Figure 5:
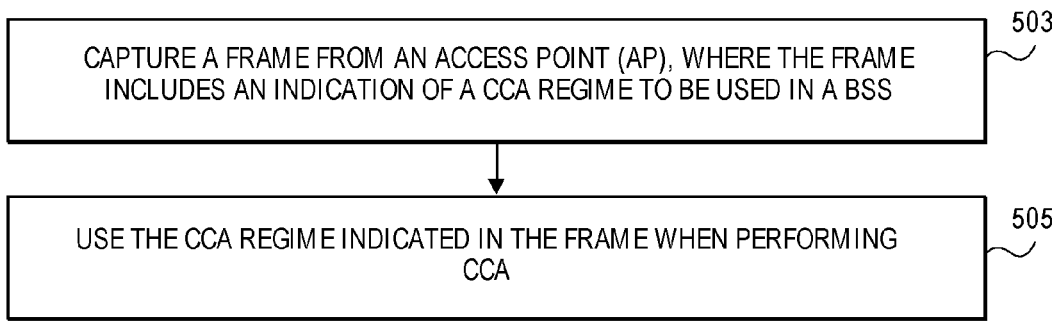
FIG. 5 is a flow diagram illustrating a process for determining a CCA regime to use, according to some embodiments.

FIG. 5 is a flow diagram illustrating a process for determining a CCA regime to use, according to some embodiments. In one embodiment, the operations of the flow diagram may be performed by a network device acting as a STA in the wireless communications network. The STA may be associated with an AP in the wireless communications network. The process is applicable in a centralized approach where the AP announces the CCA regime to be used in its BSS.

In one embodiment, the process is initiated when the network device captures a frame from the access point (AP) (block 503). The frame includes an indication of a CCA regime to be used in the BSS. For example, the frame could be a frame transmitted by the AP as a result of the AP performing any one of the processes described with reference to FIGS. 2, 3, and 4 or similar process. The network device then uses the CCA regime indicated in the frame when performing CCA (block 505).

Figure 6:
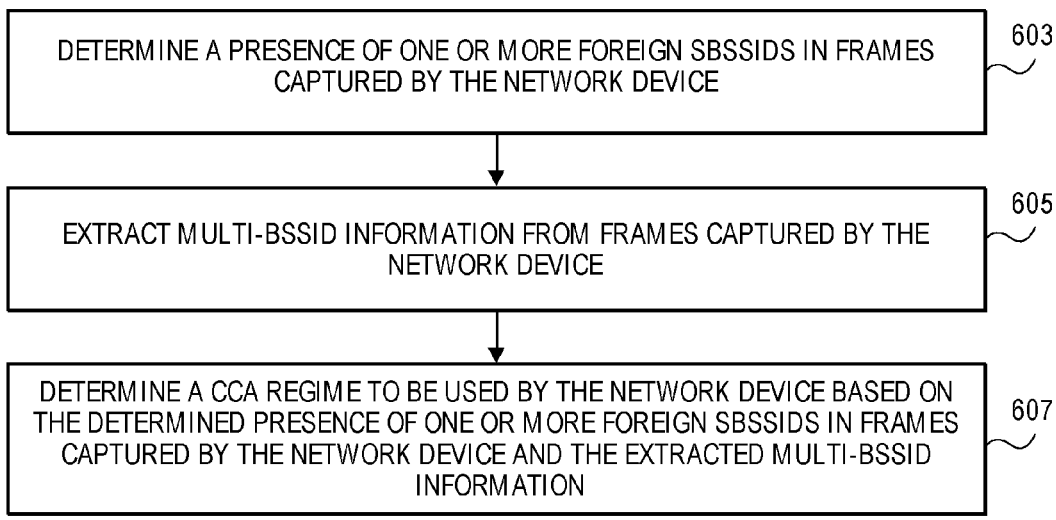
FIG. 6 is a flow diagram illustrating a process for determining a CCA regime to use, according to some embodiments.

FIG. 6 is a flow diagram illustrating a process for determining a CCA regime to use, according to some embodiments. In one embodiment, the operations of the flow diagram may be performed by a network device acting as a STA in the wireless communications network. The process is an example of a distributed approach where each STA individually determines the CCA regime it will use. In this embodiment, the STA determines the CCA regime it will use based on SBSSID information and Multi-BSSID information observed from its surroundings.

The network device (i.e., STA) determines a presence of one or more foreign SBSSIDs in frames captured by the network device (block 603). In one embodiment, the network device records SBSSID information extracted from captured frames and applies a moving filter to the recorded SBSSID information, as described with reference to block 303. The network device may use the filtered version of the SBSSID information to determine the presence of foreign SBSSIDs.

The network device extracts Multi-BSSID information from frames captured by the network device (block 605). In one embodiment, the network device keeps track of the Multi-BSSID information it has seen in captured frames. This may involve recording Multi-BSSID information extracted from the captured frames and applying a moving filter over the recorded Multi-BSSID information.

The network device determines a CCA regime to be used by the network device based on the determined presence of one or more foreign SBSSIDs in frames captured by the network device and/or the extracted Multi-BSSID information (block 607). The CCA regime (i.e., CCA threshold value) indicates a CCA threshold level that will be used by the network device to assess availability of a wireless medium. If the network device captures several frames announcing foreign SBSSIDs and/or affirmative Multi-BSSID values, this implies the possibility that there is an OBSS or MSS operating within its coverage and/or within the coverage of one of its neighboring STAs. As such, in one embodiment, if the network device determines a sufficient presence of one or more foreign SBSSIDs and/or affirmative Multi-BSSID values in frames captured by the network device (e.g., the number of captured frames announcing foreign SBSSIDs and/or affirmative Multi-BSSID values over a recent time interval exceeds a threshold level), the network device determines that it should use a more aggressive CCA regime (e.g., higher CCA threshold value) when performing CCA. It should be noted that the network device may determine the CCA regime to use based on other factors as well. For example, in an embodiment where STAs announce the CCA regime they use in their operation (e.g., announced in the CCA-Regime field), the network device may determine the CCA regime it will use based, at least in part, on such CCA regime information observed in its surroundings. For example, the network device may choose to use a CCA regime that matches the CCA regime used by most of its neighboring STAs. In one embodiment, the network device may announce the CCA regime that it will use in an outgoing frame. For this purpose, the network device may encode an outgoing frame with an indication of the CCA regime it will use and transmit the outgoing frame through a wireless medium upon determining that the wireless medium is idle (e.g., using the CCA threshold value).

In one embodiment, a network device (e.g., AP or STA) can also take into account the presence of legacy network devices when deciding a CCA regime to use. In one embodiment, the network device keeps track of the number of legacy frames it has captured within a recent time interval. As used herein, a legacy frame refers to a frame that does not specify SBSSID information, Multi-BSSID information, or CCA Regime information. The network device may determine the CCA regime to be used based on the number of legacy frames captured by the network device. For example, if the number of legacy frames captured by the network device during a recent time interval or the percentage of legacy frames captured by the network device during a recent time interval exceeds a pre-determined threshold, then this implies the presence of legacy network devices. As such, the network device may determine that a legacy CCA regime (i.e. avoiding aggressive CCA thresholds) should be used in order to be fair to the legacy network devices.

In one embodiment, a network device may announce its own evaluation of the presence of legacy frames in order to assist other nodes in determining a CCA regime to use. In one embodiment, the network device may specify this information in the Multi-BSSID field. For example, if the size of the Multi-BSSID field is four bits, then a design choice may be to designate two bits of the Multi-BSSID field for specifying the presence of legacy frames (while the other two bits are designated for specifying Multi-BSSID information).

In one embodiment, the subfield designated for specifying the presence of legacy frames may indicate how often legacy frames were captured during a recent time interval. For example, assuming two bits are designated for specifying the presence of legacy frames, if the network device only captured a small number of legacy frames or captured no legacy frames during a recent time interval, then the network device may specify a value of '00' in the subfield. On the other hand, if the network device captured a large number of legacy frames during a recent time interval, then the network device may specify a value of '11' in the subfield. Other network devices that receive this information may be able to infer the presence of legacy network devices based on this information. The values in the subfield are provided by way of example and not limitation. Any convention can be used for specifying the values in the subfield, as long as the receiving node understands what each value represents.

In one embodiment, the subfield designated for specifying the presence of legacy frames may indicate how often legacy frames were captured during a recent time interval and the level of received signal power of the legacy frames. For example, assuming two bits are designated for specifying the presence of legacy frames, if the network device captured a small number of legacy frames during a recent time interval and the received signal strength indication (RSSI) associated with those frames are in a low RSSI range (e.g., RSSI<−70 dBm), then the network device may specify a value of '00' in the subfield. On the other hand, if the network device captured a large number of legacy frames during a recent time interval and the RSSI associated with those frames are in a high RSSI range (e.g., RSSI>−60 dBm), then the network device may specify a value of '11' in the subfield. The values in the subfield are provided by way of example and not limitation. Any convention can be used for specifying the values in the subfield, as long as each receiving node understands what each value represents.

Figure 7:
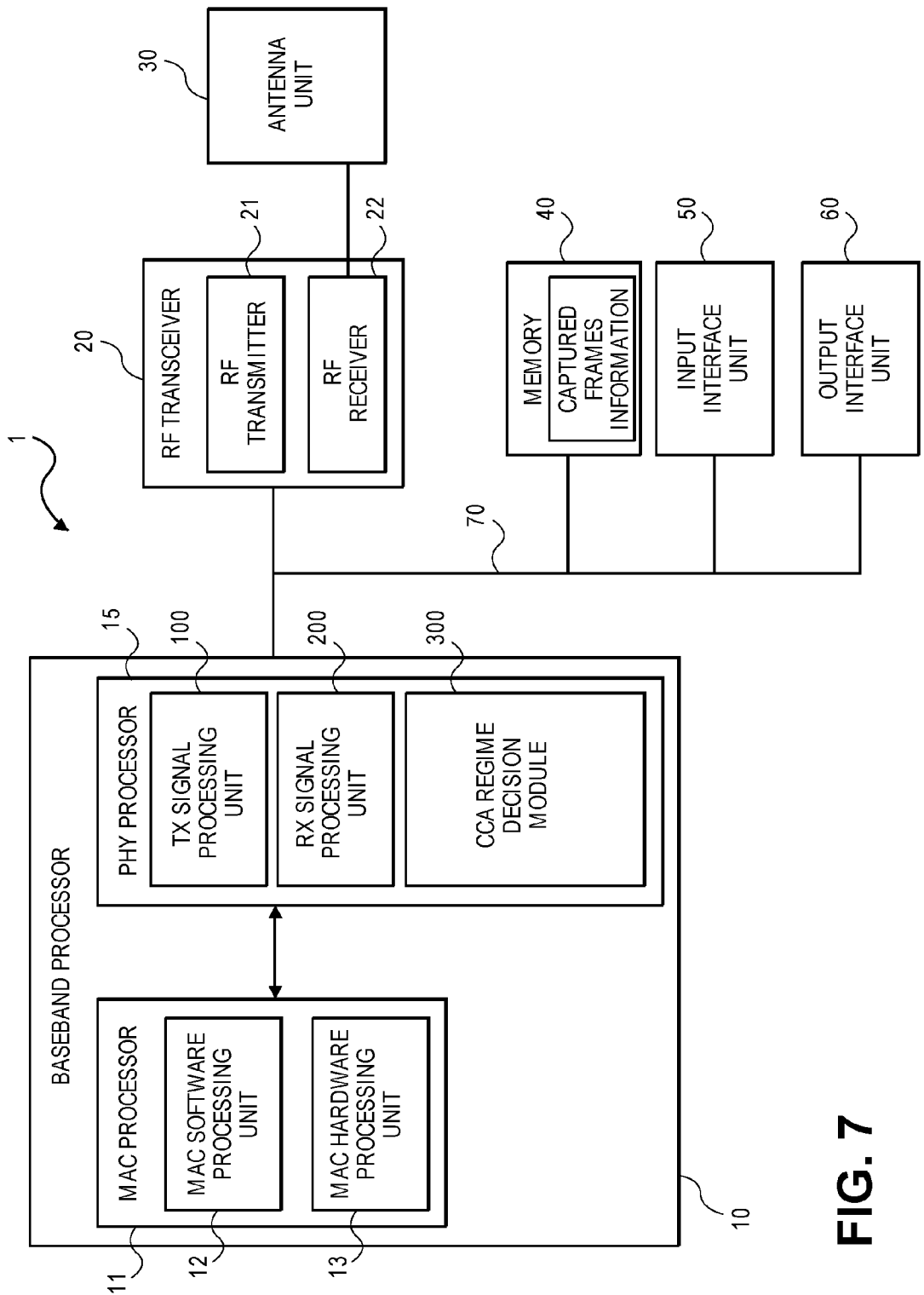
FIG. 7 is a block diagram of a network device implementing a station or access point that executes a CCA regime decision process and module, according to some embodiments.
Figure 8:
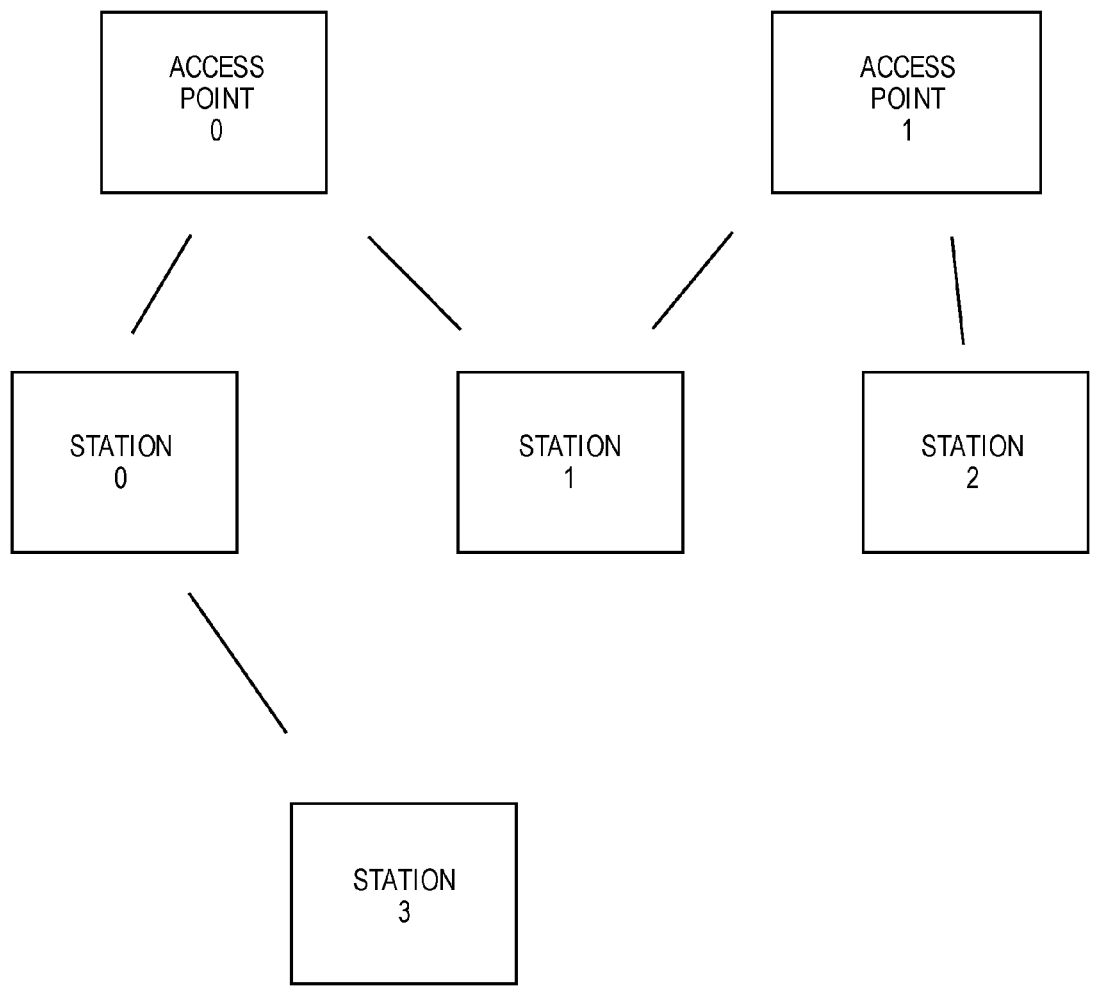
FIG. 8 is a block diagram of a wireless local area network, according to some embodiments.

FIG. 7 is a block diagram of a network device implementing a station or access point that executes a CCA regime decision process and module, according to some embodiments. In a wireless local area network (WLAN) such as the example WLAN illustrated in FIG. 8, a basic service set (BSS) includes a plurality of network devices referred to herein as WLAN devices. Each of the WLAN devices may include a medium access control (MAC) layer and a physical (PHY) layer according to IEEE (Institute of Electrical and Electronics Engineers) 802.11 standard. In the plurality of WLAN devices, at least one WLAN device may be an access point (AP) station (e.g., access point 0 and access point 1 in FIG. 8) and the other WLAN devices may be non-AP stations (non-AP STAs), (e.g., stations 0-3 in FIG. 8). Alternatively, all of the plurality of WLAN devices may be non-AP STAs in an Ad-hoc networking environment. In general, the AP STA and the non-AP STA may be each referred to herein as a station (STA). However, for ease of description, only the non-AP STA will be referred to herein as a STA whereas the AP stations are referred to herein as APs for ease of description. As shown in FIG. 8, a WLAN can have any combination of stations and access points that can form a discrete network, an ad hoc network or any combination thereof. Any number of APs and stations can be included in a WLAN and any topology and configuration of such APs and stations in the network can be utilized.

The example WLAN device 1 includes a baseband processor 10, a radio frequency (RF) transceiver 20, an antenna unit 30, memory 40, an input interface unit 50, an output interface unit 60, and a bus 70. The baseband processor 10 performs baseband signal processing, and includes a MAC processor 11 and a PHY processor 15. These processors can be any type of integrated circuit (IC) including a general processing unit or an application specific integrated circuit (ASIC).

In one embodiment, the MAC processor 11 may include a MAC software processing unit 12 and a MAC hardware processing unit 13. The memory 40 may store software (hereinafter referred to as "MAC software"), including at least some functions of the MAC layer. The MAC software processing unit 12 executes the MAC software to implement some functions of the MAC layer and the MAC hardware processing unit 13 may implement the remaining functions of the MAC layer in hardware (hereinafter referred to "MAC hardware"). However, the MAC processor 11 is not limited to this distribution of functionality.

The PHY processor 15 includes a transmitting signal processing unit 100 and a receiving signal processing unit 200 described further herein below with reference to FIGS. 9 and 10. In some embodiments, the PHY processor 15 can also implement a CCA regime decision module 300. The CCA regime decision module 300 can implement the respective functions for any combination of the embodiments described herein above with regard to FIGS. 1-6. In other embodiments, these modules may be implemented by or distributed over both the PHY processor 15 and the MAC processor 11. These modules may be implemented as software or as hardware components of either the PHY processor 15 or MAC processor 11. The CCA regime decision module 300 can be implemented as a component of the transmitting signal processing unit 100 and the receiving signal processing unit 200 or as discrete components.

The baseband processor 10, the memory 40, the input interface unit 50, and the output interface unit 60 may communicate with each other via the bus 70. The radio frequency (RF) transceiver 20 includes an RF transmitter 21 and an RF receiver 22. The memory 40 may further store an operating system and applications. In some embodiments, the memory may store recorded information about captured frames. The input interface unit 50 receives information from a user and the output interface unit 60 outputs information to the user.

The antenna unit 30 includes one or more antennas. When a multiple-input multiple-output (MIMO) or a multi-user MIMO (MU-MIMO) system is used, the antenna unit 30 may include a plurality of antennas.

Figure 9:
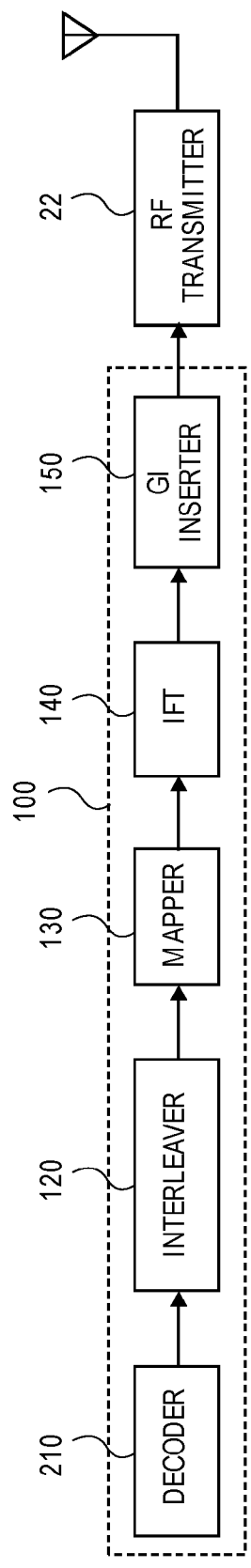
FIG. 9 is a schematic block diagram exemplifying a transmitting signal processor in a WLAN device, according to some embodiments.

FIG. 9 is a schematic block diagram exemplifying a transmitting signal processor in a WLAN device, according to some embodiments. Referring to the above drawing, a transmitting signal processing unit 100 includes an encoder 110, an interleaver 120, a mapper 130, an inverse Fourier transformer (IFT) 140, and a guard interval (GI) inserter 150. The encoder 110 encodes input data. For example, the encoder 110 may be a forward error correction (FEC) encoder. The FEC encoder may include a binary convolutional code (BCC) encoder followed by a puncturing device or may include a low-density parity-check (LDPC) encoder.

The transmitting signal processing unit 100 may further include a scrambler for scrambling the input data before encoding to reduce the probability of long sequences of 0 s or 1 s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder to change the order of bits. Interleaving may be applied only when BCC encoding is used. The mapper 130 maps the sequence of bits output from the interleaver to constellation points. If LDPC encoding is used in the encoder 110, the mapper 130 may further perform LDPC tone mapping in addition to constellation mapping.

When multiple input-multiple output (MIMO) or multiple user (MU)-MIMO is used, the transmitting signal processing unit 100 may use a plurality of interleavers 120 and a plurality of mappers 130 corresponding to the number $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When MIMO or MU-MIMO is used, the transmitting signal processing unit 100 may insert cyclic shift diversities (CSDs) to prevent unintentional beamforming. The CSD insertion may occur before or after the inverse Fourier transform 140. The CSD may be specified per transmit chain or may be specified per space-time stream. Alternatively, the CSD may be applied as a part of the spatial mapper. When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 10:
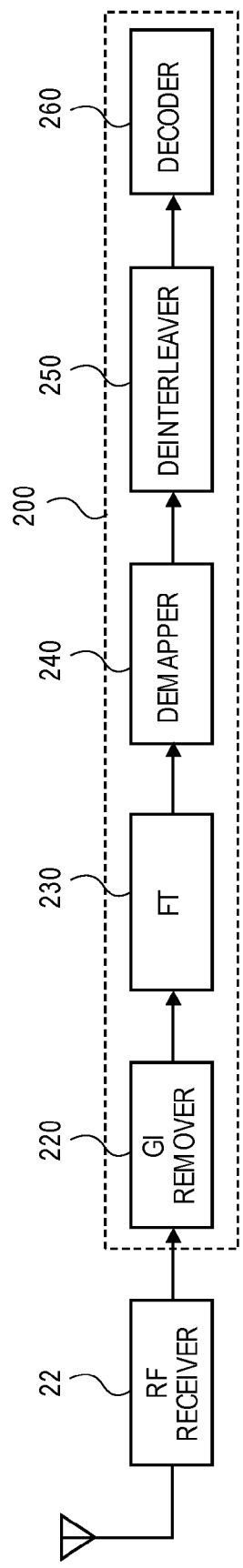
FIG. 10 is a schematic block diagram exemplifying a receiving signal processing unit in the WLAN, according to some embodiments.

FIG. 10 is a schematic block diagram exemplifying a receiving signal processing unit in the WLAN, according to some embodiments. Referring to FIG. 10, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time domain block) into a block of constellation points by using a discrete Fourier transform (DFT) or a fast Fourier transform (FFT). The Fourier transformer 230 may be provided for each receive chain.

When MIMO or MU-MIMO is used, the receiving signal processing unit 200 may use a spatial demapper for converting the Fourier transformed receiver chains to constellation points of the space-time streams and an STBC decoder for despreading the constellation points from the space-time streams into the spatial streams.

The demapper 240 demaps the constellation points output from the Fourier transformer 230 or the STBC decoder to bit streams. If LDPC encoding is used, the demapper 240 may further perform LDPC tone demapping before constellation demapping. The deinterleaver 250 deinterleaves the bits of each stream output from the demapper 240. Deinterleaving may be applied only when BCC encoding is used.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 260 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

Figure 11:
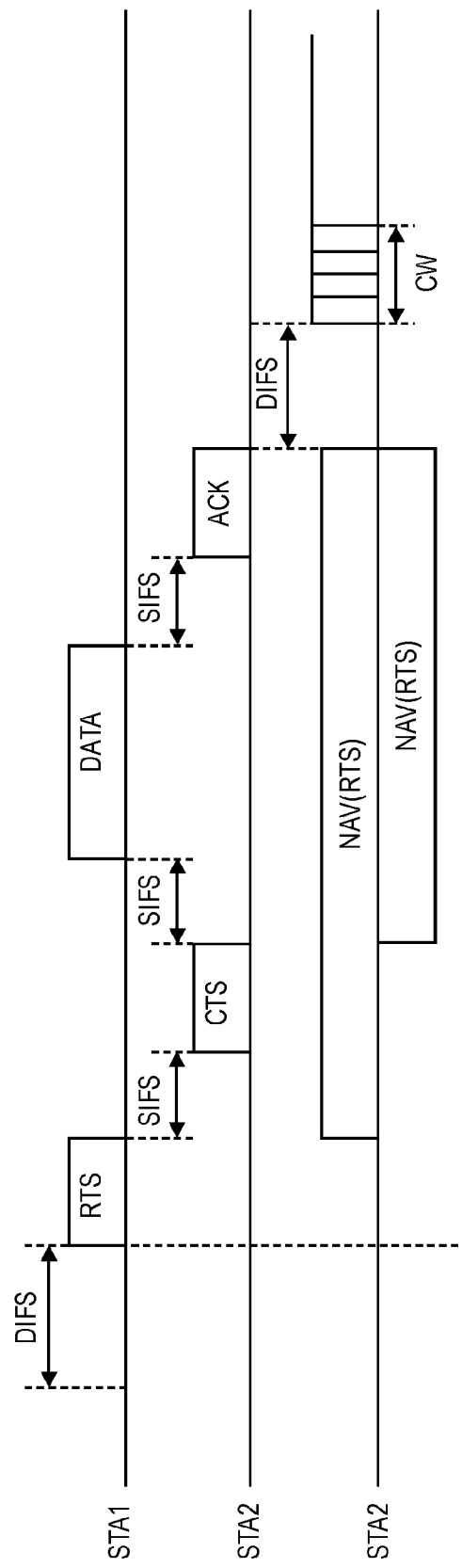
FIG. 11 is a timing diagram providing an example of the carrier sense multiple access/collision avoidance (CSMA/CA) transmission procedure, according to some embodiments.

FIG. 11 is a timing diagram providing an example of the CSMA/CA transmission procedure, according to some embodiments. In the illustrated example, STA1 is a transmit WLAN device for transmitting data, STA2 is a receive WLAN device for receiving the data, and STA3 is a WLAN device, which may be located at an area where a frame transmitted from the STA1 and/or a frame transmitted from the STA2 can be received by the WLAN device. STA1 may determine whether the channel is busy by carrier sensing. The STA1 may determine the channel occupation based on a quality of the signal on the channel or correlation of signals in the channel, or may determine the channel occupation by using a network allocation vector (NAV) timer.

When determining that the channel is not used by other devices during DIFS (that is, the channel is idle), STA1 may transmit an RTS frame to STA2 after performing backoff. Upon receiving the RTS frame, STA2 may transmit a CTS frame as a response of the CTS frame after SIFS. When STA3 receives the RTS frame, it may set the NAV timer for a transmission duration of subsequently transmitted frames (for example, a duration of SIFS+CTS frame duration+ SIFS+data frame duration+SIFS+ACK frame duration) by using duration information included in the RTS frame. When STA3 receives the CTS frame, it may set the NAV timer for a transmission duration of subsequently transmitted frames (for example, a duration of SIFS+data frame duration+ SIFS+ACK frame duration) by using duration information included in the RTS frame. Upon receiving a new frame before the NAV timer expires, STA3 may update the NAV timer by using duration information included in the new frame. STA3 does not attempt to access the channel until the NAV timer expires.

When STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, STA3 may determine whether the channel is busy through the use of carrier sensing techniques. Upon determining that the channel is not used by other devices during DIFS and after the NAV timer has expired, STA3 may attempt channel access after a contention window according to random backoff elapses.

Figures 12, 13:
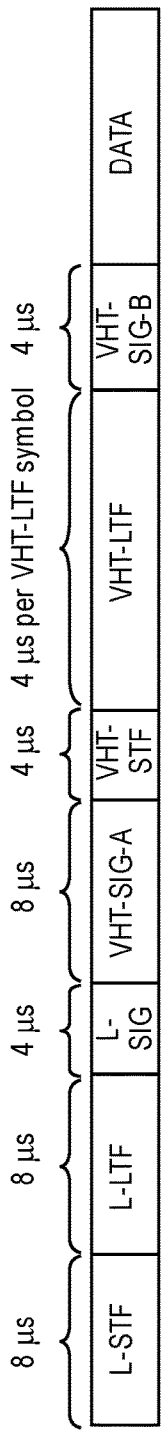
FIG. 12 is a diagram of a very high throughput (VHT) physical layer convergence protocol (PLCP) protocol data unit PPDU utilized by a WLAN device physical layer, according to some embodiments.
FIG. 13 is a table of the fields of the VHT PPDU, according to some embodiments.

FIG. 12 is a diagram of a very high throughput (VHT) PPDU utilized by the WLAN device PHY layer, according to some embodiments. FIG. 13 is a table of the fields of the VHT PPDU, according to some embodiments. Some PHY entities define PPDU that are individually addressed (where identification is based on AID or Partial AID) and some are group addressed (where identification is based on Group ID, GID). Some PHY entities provide support for 20 MHz, 40 MHz, 80 MHz and 160 MHz contiguous channel widths and support for 80+80 MHz non-contiguous channel width. The data subcarriers are modulated using binary phase shift keying (BPSK), quadrature phase shift keying (QPSK), 16-quadrature amplitude modulation (16-QAM), 64-QAM and 256-QAM. Forward error correction (FEC) coding (convolutional or LDPC coding) is used with coding rates of 1/2, 2/3, 3/4 and 5/6.

In each PHY entity, there would be fields denoted as L-SIG, SGI-A, SIG-B where some crucial information about the PSDU attributes are listed. These symbols are usually encoded with the most robust MCS. The L-SIG, SGI-A, SIG-B have very limited number of bits and it is desired to encode them in the most compact form possible. In a receiving STA, first these symbols are decoded in order to obtain vital information about the PSDU attributes and some MAC attributes. In IEEE 802.11ac, these symbols are called VHT SIG-A and VHT SIG-B symbols.

The solutions provided herein have been described with reference to a wireless LAN system; however, it should be understood that these solutions are also applicable to other network environments, such as cellular telecommunication networks, wired networks, and similar communication networks.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

IEEE 802.11ax or HE SIG-A and IEEE 802.11ax or HE SIG-B are referred to simply as simply by SIG-A and SIG-B and are amendments to the 802.11 standard directed at addressing these problems. Unlike previous amendments where the focus was on improving aggregate throughput, this amendment focuses on improving metrics that reflect user experience, such as average per station throughput, the 5th percentile of per station throughput of a group of stations, and area throughput. Improvements will be made to support environments such as wireless corporate office, outdoor hotspot, dense residential apartments, and stadiums.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

While the flow diagrams in the figures herein show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method executed by a network device in a wireless local area network (WLAN) to improve efficiency for clear channel assessment (CCA) in the WLAN, the method comprising:
encoding an outgoing frame with an indication of a CCA threshold value to be used in a basic service set (BSS) associated with the network device, wherein the CCA threshold value indicated in the outgoing frame indicates a CCA threshold level used by all devices in the BSS to assess availability of a wireless medium upon which all the devices in the BSS are operating;
determining that the wireless medium is idle based on the CCA threshold value; and
transmitting the outgoing frame through the wireless medium upon determining that the wireless medium is idle.

2. The method of claim 1, further comprising:
determining a number of frames captured by the network device that are not destined for the network device and are from an overlapping BSS (OBSS); and
determining the CCA threshold value to be used in the BSS based on the determined number of frames captured by the network device that are not destined for the network device and are from an OBSS.

3. The method of claim 2, wherein determining the number of frames captured by the network device that are not destined for the network device and are from an OBSS comprises recording destination information extracted from the frames captured by the network device and processing the recorded destination information.

4. The method of claim 1, further comprising:
determining a presence of one or more foreign short basic service set identifiers (SBSSIDs) in frames captured by the network device, wherein each of the one or more foreign SBSSIDs identify a BSS that is different from the BSS associated with the network device and wherein each of the one or more foreign SBSSIDs is encoded using less bits than a basic service set identifier (BSSID) of the BSS that that foreign SBSSID identifies; and
determining the CCA threshold value to be used in the BSS based on the determined presence of one or more foreign SBSSIDs in frames captured by the network device.

5. The method of claim 4, wherein determining the presence of one or more foreign SBSSIDs in frames captured by the network device comprises recording SBSSID information extracted from frames captured by the network device and processing the recorded SBSSID information.

6. The method of claim 4, further comprising:
extracting multi-BSSID information from frames captured by the network device, wherein multi-BSSID information in a frame indicates whether a network device that originated that frame detected a presence of one or more foreign SBSSIDs, and wherein determining the CCA threshold value to be used in the BSS is further based on the extracted multi-BSSID information.

7. The method of claim 1, further comprising:
determining a number of legacy frames captured by the network device; and
determining the CCA threshold value to be used in the BSS based on the determined number of legacy frames captured by the network device.

8. A method executed by a network device in a wireless local area network (WLAN) to improve efficiency for clear channel assessment (CCA) in the WLAN, the method comprising:
encoding an outgoing frame with a short basic service set identifier (SBSSID) associated with the network device, wherein the SBSSID identifies a basic service set (BSS) associated with the network device and wherein the SBSSID is encoded using less bits than a basic service set identifier (BSSID) of the BSS associated with the network device;
determining a presence of one or more foreign short basic service set identifiers (SBSSIDs) in frames captured by the network device, wherein a foreign SBSSID identifies a BSS that is different from the BSS associated with the network device;
determining a Multi-BSSID value based on the determined presence of one or more foreign SBSSIDs in frames captured by the network device;
encoding the outgoing frame with the Multi-BSSID value; and
transmitting the outgoing frame through a wireless medium.

9. The method of claim 8, wherein determining the presence of one or more foreign SBSSIDs in frames captured by the network device through the wireless medium comprises recording SBSSID information extracted from frames captured by the network device and applying a moving filter over the recorded SBSSID information.

10. The method of claim 8, further comprising:
determining a number of legacy frames captured by the network device; and
encoding the outgoing frame with an indication of a presence of legacy frames based on the number of legacy frames captured by the network device.

11. The method of claim 8, further comprising:
determining a CCA threshold value to be used by the network device based on the determined presence of one or more foreign SBSSIDs in frames captured by the network device.

12. The method of claim 11, further comprising:
extracting multi-BSSID information from frames captured by the network device, wherein multi-BSSID information in a frame indicates whether a network device that originated that frame detected a presence of one or more foreign SBSSIDs, and wherein determining the CCA threshold value to be used by the network device is further based on the extracted multi-BSSID information.

13. The method of claim 8, further comprising:
encoding the outgoing frame with an indication of a CCA threshold value that has been used by the network device to assess availability of the wireless medium and will be used by the network device to assess availability of the wireless medium.

14. A network device to improve efficiency for clear channel assessment (CCA) in a wireless local area network (WLAN), the network device comprising:
a non-transitory machine-readable medium having stored therein a CCA regime decision module; and
a processor coupled to the non-transitory machine-readable medium, the processor configured to execute the CCA regime decision module, the CCA regime decision module configured to encode an outgoing frame with an indication of a CCA threshold value to be used by the network device, wherein the CCA threshold value indicated in the outgoing frame indicates a CCA threshold level that will be used by the network device to assess availability of a wireless medium, the CCA regime decision module further configured to determine that the wireless medium is idle based on the CCA threshold value and transmit the outgoing frame through the wireless medium upon determining that the wireless medium is idle.

15. The network device of claim 14, wherein the CCA regime decision module is further configured to determine a number of frames captured by the network device that are not destined for the network device and are from an overlapping BSS (OBSS) and determine the CCA threshold value to be used by the network device based on the determined number of frames captured by the network device that are not destined for the network device and are from an OBSS.

16. The network device of claim 15, wherein the CCA regime decision module is further configured to record destination information extracted from the frames captured by the network device and process the recorded destination information.

17. The network device of claim 14, wherein the CCA regime decision module is further configured to determine a presence of one or more foreign short basic service set identifiers (SBSSIDs) in frames captured by the network device, wherein each of the one or more foreign SBSSIDs identify a BSS that is different from the BSS associated with the network device and wherein each of the one or more foreign SBSSIDs is encoded using less bits than a basic service set identifier (BSSID) of the BSS that that foreign SBSSID identifies, the CCA regime decision module further configured to determine the CCA threshold value to be used by the network device based on the determined presence of one or more foreign SBSSIDs in frames captured by the network device.

18. The network device of claim 17, wherein the CCA regime decision module is further configured to record SBSSID information extracted from frames captured by the network device and process the recorded SBSSID information.

19. The network device of claim 17, wherein the CCA regime decision module is further configured to extract multi-BSSID information from frames captured by the network device, wherein multi-BSSID information in a frame indicates whether a network device that originated that frame detected a presence of one or more foreign SBSSIDs, and wherein the CCA threshold value to be used by the network device is further determined based on the extracted multi-BSSID information.

20. The network device of claim 14, wherein the indication of the CCA threshold value is encoded in a SIG-A field of a physical layer header of the outgoing frame, and wherein the CCA regime decision module is further configured to encode the outgoing frame with a short basic service set identifier (SBSSID) associated with the network device in the SIG-A field of the physical layer header of the outgoing frame, wherein the SBSSID identifies a basic service set (BSS) associated with the network device and wherein the SBSSID is encoded using less bits than a basic service set identifier (BSSID) of the BSS associated with the network device.

* * * * *